US012477150B2

(12) United States Patent
Li et al.

(10) Patent No.: US 12,477,150 B2
(45) Date of Patent: Nov. 18, 2025

(54) COMPRESSION-INFORMED VIDEO SUPER-RESOLUTION

(71) Applicant: Google LLC, Mountain View, CA (US)

(72) Inventors: Yinxiao Li, Sunnyvale, CA (US); Peyman Milanfar, Menlo Park, CA (US); Feng Yang, Sunnyvale, CA (US); Ce Liu, Cambridge, MA (US); Ming-Hsuan Yang, Cupertino, CA (US); Pengchong Jin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/256,837

(22) PCT Filed: Aug. 5, 2021

(86) PCT No.: PCT/US2021/044630
§ 371 (c)(1),
(2) Date: Jun. 9, 2023

(87) PCT Pub. No.: WO2022/231643
PCT Pub. Date: Nov. 3, 2022

(65) Prior Publication Data
US 2024/0022760 A1 Jan. 18, 2024

Related U.S. Application Data

(60) Provisional application No. 63/179,795, filed on Apr. 26, 2021.

(51) Int. Cl.
*H04N 19/59* (2014.01)
*G06T 3/18* (2024.01)
(Continued)

(52) U.S. Cl.
CPC ............. *H04N 19/59* (2014.11); *G06T 3/18* (2024.01); *G06V 10/761* (2022.01);
(Continued)

(58) Field of Classification Search
CPC .... H04N 19/59; H04N 19/117; H04N 19/503; H04N 19/70; H04N 19/80; H04N 19/17;
(Continued)

(56) References Cited

U.S. PATENT DOCUMENTS 10,701,394 B1 * 6/2020 Caballero .............. G06N 3/045
11,449,966 B2    9/2022 Su et al.
2019/0206026 A1 * 7/2019 Vemulapalli .......... G06N 20/00

OTHER PUBLICATIONS

Caballero, "Real-Time Video Super-Resolution with Spatio-Temporal Networks and Motion Compensation," arXiv:1611.05250v2 [cs.CV] Apr. 10, 2017 (Year: 2017).*
(Continued)

*Primary Examiner* — Shadan E Haghani
(74) *Attorney, Agent, or Firm* — DORITY & MANNING P.A.

(57) ABSTRACT

Example aspects of the present disclosure are directed to systems and methods which feature a machine-learned video super-resolution (VSR) model which has been trained using a bi-directional training approach. In particular, the present disclosure provides a compression-informed (e.g., compression-aware) super-resolution model that can perform well on real-world videos with different levels of compression. Specifically, example models described herein can include three modules to robustly restore the missing information caused by video compression. First, a bi-directional recurrent module can be used to reduce the accumulated warping error from the random locations of the intra-frame from compressed video frames. Second, a detail-aware flow estimation module can be added to enable recovery of high resolution (HR) flow from compressed low resolution (LR)
(Continued)

frames. Finally, a Laplacian enhancement module can add high-frequency information to the warped HR frames washed out by video encoding.

14 Claims, 5 Drawing Sheets

(51) Int. Cl.
    *G06V 10/74*      (2022.01)
    *H04N 19/117*      (2014.01)
    *H04N 19/503*      (2014.01)
    *H04N 19/70*      (2014.01)
    *H04N 19/80*      (2014.01)

(52) U.S. Cl.
    CPC ......... *H04N 19/117* (2014.11); *H04N 19/503* (2014.11); *H04N 19/70* (2014.11); *H04N 19/80* (2014.11)

(58) Field of Classification Search
    CPC .... H04N 19/172; H04N 19/543; H04N 19/85; H04N 19/577; H04N 19/587; H04N 19/86; H04N 19/132; G06T 3/18; G06V 10/761
    See application file for complete search history.

(56) References Cited

OTHER PUBLICATIONS

Yan Huang, Wei Wang, and Liang Wang. 2015. Bidirectional recurrent convolutional networks for multi-frame super-resolution. In Proceedings of the 29th International Conference on Neural Information Processing Systems—vol. 1 (NIPS'15), vol. 1. MIT Press, Cambridge, MA, USA, 235-243. (Year: 2015).*

Sajjadi, "Frame-Recurrent Video Super-Resolution, "arXiv:1801.04590v4 [cs.CV] Mar. 25, 2018 (Year: 2018).*

Li, "COMISR: Compression-Informed Video Super-Resolution," arXiv:2105.01237v2 [cs.CV] Oct. 12, 2021 (Year: 2021).*

Huang et al., "Video Super-Resolution via Bidirectional Recurrent Convolutional Networks", IEEE Transactions on Pattern Analysis and Machine Intelligence, vol. 40, No. 4, Apr. 2018, 15 pages.

Li et al., "COMISR: Compression-Informed Video Super-Resolution", IEEE/CVF International Conference on Computer Vision (ICCV), 2021, 10 pages.

Sajjadi et al., "Frame-Recurrent Video Super-Resolution", arXiv:1801.04590v4, 10 pages.

Huang et al., "Bidirectional Recurrent Convolutional Networks for Multi-Frame Super-Resolution", Advances in Neural Information Processing Systems, Dec. 7, 2015, pp. 235-243.

Schuster et al., "Bidirectional Recurrent Neural Networks", IEEE Transactions on Signal Processing, vol. 45, No. 11, Nov. 1, 1997, pp. 2673-2681.

Song et al., Video Super-Resolution Algorithm Using Bi-Directional Overlapped Block Motion Compensation and On-the-Fly Dictionary Training, IEEE Transactions on Circuits and Systems for Video Technology, vol. 21, No. 3, Mar. 1, 2011, pp. 274-285.

International Search Report for PCT/US2021/044630, mailed on Jan. 20, 2022, 6 pages.

International Preliminary Report on Patentability for Application No. PCT/US2021/044630, mailed Nov. 9, 2023, 10 pages.

Chu et al., "Learning Temporal Coherence via Self-Supervision for GAN-based Video Generation", ACM Transactions on Graphics (TOG), vol. 39, No. 4, Jul. 2020, 13 pages.

* cited by examiner

COMPRESSION-INFORMED VIDEO SUPER-RESOLUTION

RELATED APPLICATIONS

This application is based upon and claims the right of priority under 35 U.S.C. § 371 to International Application No. PCT/US2021/044630 filed on Aug. 5, 2021, which claims priority to and the benefit of U.S. Provisional Patent Application No. 63/179,795, filed Apr. 26, 2021. Applicant claims priority to and the benefit of each of such applications and incorporate all such applications herein by reference in its entirety.

FIELD

The present disclosure relates generally to systems and methods for performing compression-informed video super-resolution. More particularly, the present disclosure relates to systems and methods which feature a machine-learned video super-resolution model which has been trained using a bi-directional training approach.

BACKGROUND

Super-resolution is a fundamental research problem in computer vision with numerous applications. Systems which perform super-resolution aim to reconstruct detailed high-resolution (HR) image(s) from low-resolution (LR) input(s). When the input is one single image, the reconstruction process usually uses learned image priors to recover high-resolution details of the given image, which can be referred to as single image super-resolution (SISR). When numerous frames in a video are available, certain reconstruction processes can use both image priors and inter-frame information to generate temporally smooth high-resolution results, which can be referred to as video super-resolution (VSR).

Although great progress has been made in the field of super-resolution, existing SISR and VSR methods rarely take into account compression. Specifically, certain previous work used "uncompressed" data to emphasize the high-quality, low-compression-ratio videos. As such, previous methods tend to generate significant artifacts when operated on heavily compressed input videos.

In particular, most digital videos (e.g., those present on the Internet or mobile devices such as smartphones) are stored and/or streamed with different levels of compression to achieve a selected visual quality level. For example, a popular compression rate (Constant Rate Factor (CRF)) for H.264 encoding is 23 as a trade-off between quality and file size. Existing techniques which have been designed and optimized for application of VSR to uncompressed video data do not perform as well when applied to videos which have been compressed in such fashion.

One possible solution is to apply a denoising model to remove compression artifacts, followed by one of the state-of-the-art VSR models. At first glance, this is appealing since a VSR model is fed with high-quality frames, similar to directly using the evaluation data. However, experiments indicated that such setting would not boost the final performance; and in fact it might even make it worse. With pre-processing, it is highly likely that the denoising model in the first step will change the degradation kernel used implicitly in the VSR model training. So essentially, the VSR models are being applied to more challenging data.

Another possible solution is training the existing state-of-the-art VSR models on the compressed frames. This can bring additional compression information to the model training. However, experiments indicated that simply using compressed frames in training brings only modest improvement. In fact, without specific changes to the designs of network modules, such training data may even hurt the overall performance.

Thus, improved systems, methods, model architectures, and training approaches are needed which provide improved VSR on compressed video data.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method to bi-directionally train a machine-learned video super-resolution (VSR) model using compressed video data. The computer-implemented method includes obtaining, by a computing system may include one or more computing devices, a set of ground truth video data that may include a plurality of ground truth higher-resolution (HR) video frames and a plurality of lower-resolution (LR) video frames, where the plurality of LR video frames respectively correspond to the plurality of ground truth HR video frames, and where the plurality of ground truth HR video frames and the plurality of LR video frames are arranged in a temporal sequence that corresponds to a compressed video. The method also includes performing, by the computing system, a forward temporal prediction to generate a forward-predicted HR video frame for the current position in the temporal sequence based on one or more video frames associated with one or more previous positions in the temporal sequence. The method also includes performing, by the computing system, a backward temporal prediction to generate a backward-predicted HR video frame for the current position in the temporal sequence based on one or more video frames associated with one or more subsequent positions in the temporal sequence. The method also includes evaluating, by the computing system, a loss function for the machine-learned VSR model, where the loss function compares the ground truth HR video frame to the forward-predicted HR video frame and compares the ground truth HR video frame to the backward-predicted HR video frame. The method also includes modifying, by the computing system, one or more values of one or more parameters of the machine-learned VSR model based on the loss function. Other embodiments of this aspect include corresponding computer systems, apparatus, and computer programs recorded on one or more computer storage devices, each configured to perform the actions of the methods.

Another example aspect is directed to a computing system that includes one or more processors and one or more non-transitory computer-readable media that collectively store a machine-learned video super resolution (VSR) model and instructions that, when executed by the one or more processors, cause the computing system to employ the machine-learned VSR model to super-resolve a compressed video.

The machine-learned video super resolution (VSR) model can include: a flow estimation portion configured to: process a previous or subsequent lower resolution (LR) video frame and a current LR video frame to generate a LR flow estimation and a higher resolution (HR) flow estimation; warp the previous or subsequent LR video frame according to the LR flow estimation to generate a predicted LR video frame for a current position in a temporal sequence; and warp a previous or subsequent HR video frame according to the HR flow estimation to generate an intermediate HR video frame for the current position in the temporal sequence; a Laplacian enhancement portion configured to enhance the intermediate HR video frame; and a frame generation portion configured to process the intermediate HR video frame and the current LR video frame to generate a predicted HR video frame for the current position in the temporal sequence.

Implementations of the described techniques may include hardware, a method or process, or computer software on a computer-accessible medium.

BRIEF DESCRIPTION OF THE DRAWINGS

Detailed discussion of embodiments directed to one of ordinary skill in the art is set forth in the specification, which makes reference to the appended figures, in which.

Figure 1A:
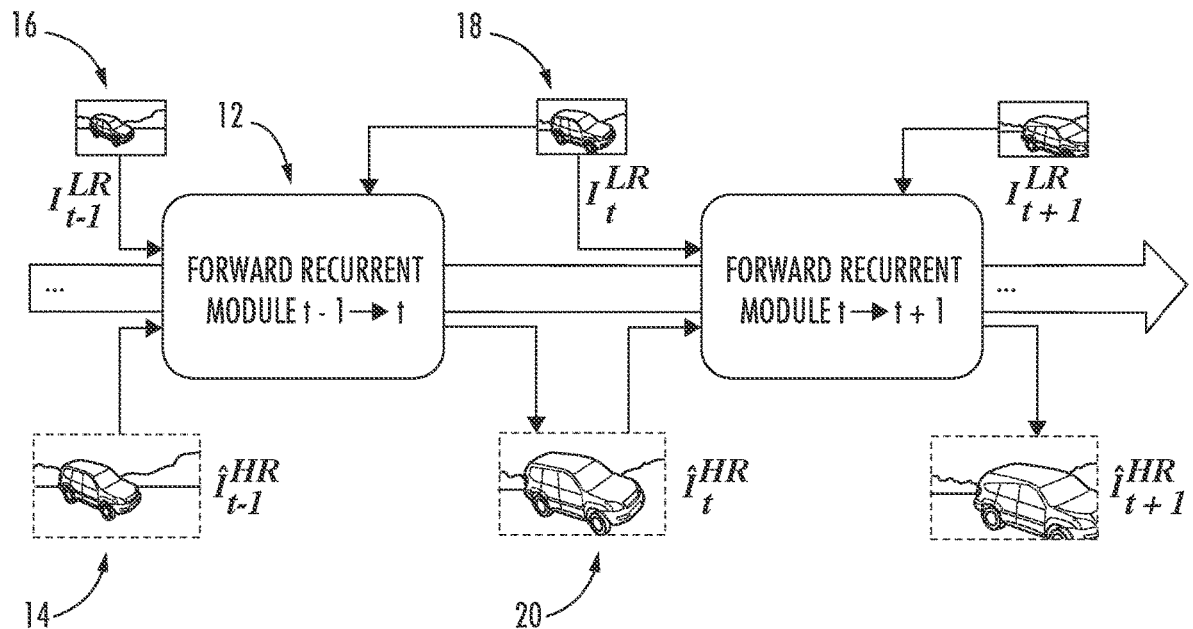
FIGS. 1A and 1B depict a graphical diagram of an example process to bi-directionally train a machine-learned video super-resolution model according to example embodiments of the present disclosure.

Reference numerals that are repeated across plural figures are intended to identify the same features in various implementations.

DETAILED DESCRIPTION

Overview

Example aspects of the present disclosure are directed to systems and methods which feature a machine-learned video super-resolution (VSR) model which has been trained using a bi-directional training approach. In particular, the present disclosure provides a compression-informed (e.g., compression-aware) super-resolution model that can perform well on real-world videos with different levels of compression. Specifically, example models described herein can include three modules to robustly restore the missing information caused by video compression. First, a bi-directional recurrent module can be used to reduce the accumulated warping error from the random locations of the intra-frame from compressed video frames. Second, a detail-aware flow estimation module can be added to enable recovery of high resolution (HR) flow from compressed low resolution (LR) frames. Finally, a Laplacian enhancement module can add high-frequency information to the warped HR frames washed out by video encoding. Example implementations of the proposed model can in some instances be referred to as COMpression-Informed video Super-Resolution (COMISR).

In U.S. Provisional Patent Application No. 63/179,795, which is included in and forms a portion of this disclosure, the effectiveness of example implementations of COMISR with the three modules is demonstrated with ablation studies. In particular, extensive experiments were conducted on several VSR benchmark datasets, with videos compressed with different CRF values. The experiments showed that the COMISR model achieves significant performance gain on compressed video (e.g., CRF23); and meanwhile maintains competitive performance on uncompressed video. In addition, U.S. Provisional Patent Application No. 63/179,795 shows evaluation results based on different combinations of a state-of-the-art VSR model and an off-the-shelf video denoiser. Finally, U.S. Provisional Patent Application No. 63/179,795 demonstrates the robustness of the COMISR model on simulating streaming YouTube videos, which are compressed with proprietary encoders.

Thus, one example aspect of the present disclosure is directed to a compression-informed model for super-resolving real-world compressed videos for practical applications. Another example aspect includes three modules that are novel to VSR to effectively improve the critical components for video super-resolution on compressed frames. Finally, extensive experiments were conducted on state-of-the-art VSR models on compressed benchmark datasets.

The systems and methods of the present disclosure provide a number of technical effects and benefits. As one example, the models described herein can perform improved image processing such as improved super-resolution of imagery (e.g., increasing the resolution of imagery via image synthesis). For example, by performing bi-directional training of a VSR model, the VSR model can be better equipped/trained to account for temporal artifacts introduced by a compression process.

Specifically, one common technique used in video compression is to apply different algorithms to compress and encode frames at different positions in the video stream. Typically, a codec randomly selects several reference frames, known as the intra-frames, and compresses them independently without using information from other frames. It then compresses other frames by exploiting consistency and encoding differences from the intra-frames. As a result, the intra-frames usually require more bits to encode and have less compression artifacts than other frames. In video super-resolution, since the location of intra-frames is not known in advance, to effectively reduce the accumulated error from the unknown location of intra-frames, the proposed bi-directional approach can be used to enforce the forward and backward consistency of the LR warped inputs and HR predicted frames.

The systems and methods of the present disclosure can be used in a number of applications. In one example, the models described herein can be used to increase the resolution of compressed videos. For example, the compressed videos can be transmitted or streamed in compressed form and then super-resolved at the end device displaying the video. This can provide the technical benefit of conserving network bandwidth and storage space as the compressed videos may require less computational resources to transmit and/or store. As examples, the compressed videos can be compressed video conference video streams, compressed user-generated content videos, and/or any other types of videos.

With reference now to the Figures, example embodiments of the present disclosure will be discussed in further detail.

Example Model Training and Inference

Example COMISR models are designed using the recurrent formulation, which feeds the previous information to the current frame, which is similar to the state-of-the-art video SR methods. The recurrent design usually entails low memory consumption, and can be applied to numerous inference tasks in videos.

An example model architecture described herein can include three novel portions, namely bi-directional recurrent warping, detail-aware flow estimation, and Laplacian enhancement portion, to make the model robust to compressed videos. Given the LR ground truth frames, the model can apply forward and backward recurrent modules (see FIGS. 1A-B) to generate the HR frame predictions, and compute content losses against HR ground truth frames in both directions. The recurrent module can predict flows and generate warped frames in both LR and HR, and train the network end to end using the LR and HR ground truth frames.

Example Bi-Directional Recurrent Module

One technique used in video compression is to apply different algorithms to compress and encode frames at different positions in the video stream. Typically, a codec randomly selects several reference frames, known as the intra-frames, and compresses them independently without using information from other frames. It then compresses other frames by exploiting consistency and encoding differences from the intra-frames. As a result, the intra-frames usually require more bits to encode and have less compression artifacts than other frames. In video super-resolution, since the location of intra-frames is not known in advance, to effectively reduce the accumulated error from the unknown location of intra-frames, the present disclosure proposes a bi-directional recurrent network to enforce the forward and backward consistency of the LR warped inputs and HR predicted frames.

Specifically, the bi-directional recurrent network can include symmetric modules for forward and backward directions. In the forward direction, the model can first estimate both the LR flow $F_{t-1 \to t}^{LR}$ and HR one $F_{t-1 \to t}^{HR}$ using the LR frames $I_{t-1}^{LR}$ and $I_t^{LR}$. The model can then apply different operations separately in LR and HR streams. In the LR stream, the model can warp the previous LR frame $I_{t-1}^{LR}$ to time t using $F_{t-1 \to t}^{LR}$ to obtain the warped LR frame $\tilde{I}_t^{LR}$, which will be used at later stages:

$$\tilde{I}_t^{LR} = \text{Warp}(I_{t-1}^{LR}, F_{t-1 \to t}^{LR}) \tag{1}$$

In the HR stream, the model can warp the previous predicted frames $\hat{I}_{t-1}^{HR}$ to time t using $F_{t-1 \to t}^{HR}$ to obtain the warped HR frame $\tilde{I}_t^{HR}$, followed by a Laplacian Enhancement Module to generate accurate HR warped frame:

$$\tilde{I}_t^{HR,Warp} = \text{Warp}(\hat{I}_{t-1}^{LR}, F_{t-1 \to t}^{HR}) \tag{2}$$

$$\tilde{I}_t^{HR} = \text{Laplacian}(\tilde{I}_t^{HR,Warp}) + \tilde{I}_t^{HR,Warp} \tag{3}$$

The model can then apply a space-to-depth operation on $\tilde{I}_t^{HR}$ to shrink back its resolution while expanding its channel, fuse it with the LR input $I_t^{LR}$ and pass the concatenated frame to the HR frame generator to get our final HR prediction $\hat{I}_t^{HR}$. A training process can compare $\hat{I}_t^{HR}$ with the ground truth HR $I_t^{HR}$ to measure the loss.

Similarly, the model can apply the symmetric operations in the backward direction to obtain the warped LR frame and the predicted HR frame. In this case, the detail-aware flow estimation module can generate the backward flow from time t to t−1, and warping can be done by applying the backward flow to the frame at time t to estimate the frame at time t−1.

Figure 1B:
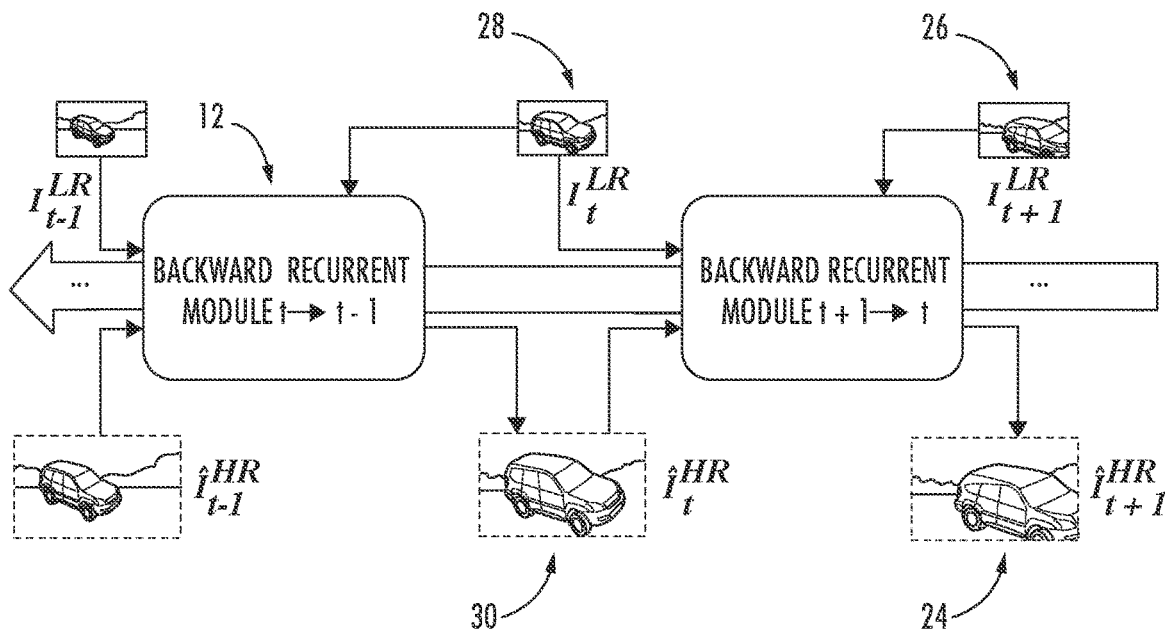

As examples, FIGS. 1A and 1B show an example VSR model being used for forward temporal prediction and backward temporal prediction, respectively. In some implementations of the present disclosure, forward temporal prediction can be performed in both training and inference while backward temporal prediction can be performed only during training.

Specifically, in some implementations, to train a VSR model a computing system can obtain a number of sets of ground truth training data. Training iterations can be performed for batches of training videos, wherein each batch contains one or more sets of ground truth video data.

In particular, a set of ground truth video data can include a plurality of ground truth higher-resolution (HR) video frames and a plurality of lower-resolution (LR) video frames. The plurality of LR video frames respectively correspond to the plurality of ground truth HR video frames. For example, each LR frame can be a relatively lower resolution version of a corresponding one of the HR frames. In one example, the frames of an HR video can be downsampled and/or compressed to generate the LR frames. The HR frames may or may not be compressed themselves.

The plurality of ground truth HR video frames and the plurality of LR video frames can be arranged in a temporal sequence. As one example, the temporal sequence can correspond to numbered frames which are ordered in a sequence and which were captured by an image capture device in sequential order.

The training of the model can occur over one or more of the positions in the temporal sequence. For example, training can occur over all of the positions in the temporal sequence.

Specifically, a VSR model can be used to perform a forward temporal prediction to generate a forward-predicted HR video frame for the current position in the temporal sequence based on one or more video frames associated with one or more previous positions in the temporal sequence. One example of a forward temporal prediction is shown in FIG. 1A. In addition, according to an aspect of the present disclosure, the VSR model can also be used to perform a backward temporal prediction to generate a backward-predicted HR video frame for the current position in the temporal sequence based on one or more video frames associated with one or more subsequent positions in the temporal sequence. One example of a backward temporal prediction is shown in FIG. 1B.

In some implementations, the forward and backward models are symmetric and share weights. Thought of differently, the same model can be used for each of the forward and backward passes, but applied with a different (e.g., opposite) ordering or sequence to the frames. For example, the order of the frames can simply be inverted.

Having performed the forward and/or backward temporal predictions, the computing system can evaluate a loss function for the machine-learned VSR model. As one example, the loss function can both (1) compare the ground truth HR video frame to the forward-predicted HR video frame produced by the forward temporal prediction and (2) compare the ground truth HR video frame to the backward-predicted HR video frame produced by the backward temporal prediction. The loss function can be evaluated jointly for both (1) and (2) above, or (1) and (2) can be separately evaluated and then summed or otherwise handled together (e.g., as a batch).

The computing system can modify one or more values of one or more parameters of the machine-learned VSR model based on the loss function. For example, backpropagation of errors can be used to update the values of parameters of the machine-learned VSR model according to the gradient of the loss function.

In particular, referring specifically to FIG. 1A, in some implementations, performing the forward temporal prediction can include processing, by a computing system and using the machine-learned VSR model 12, a previous HR video frame 14 associated with a previous position in the temporal sequence, a previous LR video frame 16 associated with the previous position in the temporal sequence, and a current LR video frame 18 associated with a current position in the temporal sequence to generate the forward-predicted HR video frame 20 for the current position in the temporal sequence.

Likewise, referring specifically to FIG. 1B, performing the backward temporal prediction can include processing, by the computing system using the machine-learned VSR model 12, a subsequent HR video frame 24 associated with a subsequent position in the temporal sequence, a subsequent LR video frame 26 associated with the subsequent position in the temporal sequence, and a current LR 28 associated with a current position in the temporal sequence to generate the backward-predicted HR video frame 30 for the current position in the temporal sequence;

The previous HR video frame 14 can be a previous predicted HR video frame or can be a previous ground truth HR video frame. Likewise, the subsequent HR video frame 24 can be a subsequent predicted HR video frame or can be a subsequent ground truth HR video frame.

Example Recurrent Model Details

Figure 2:
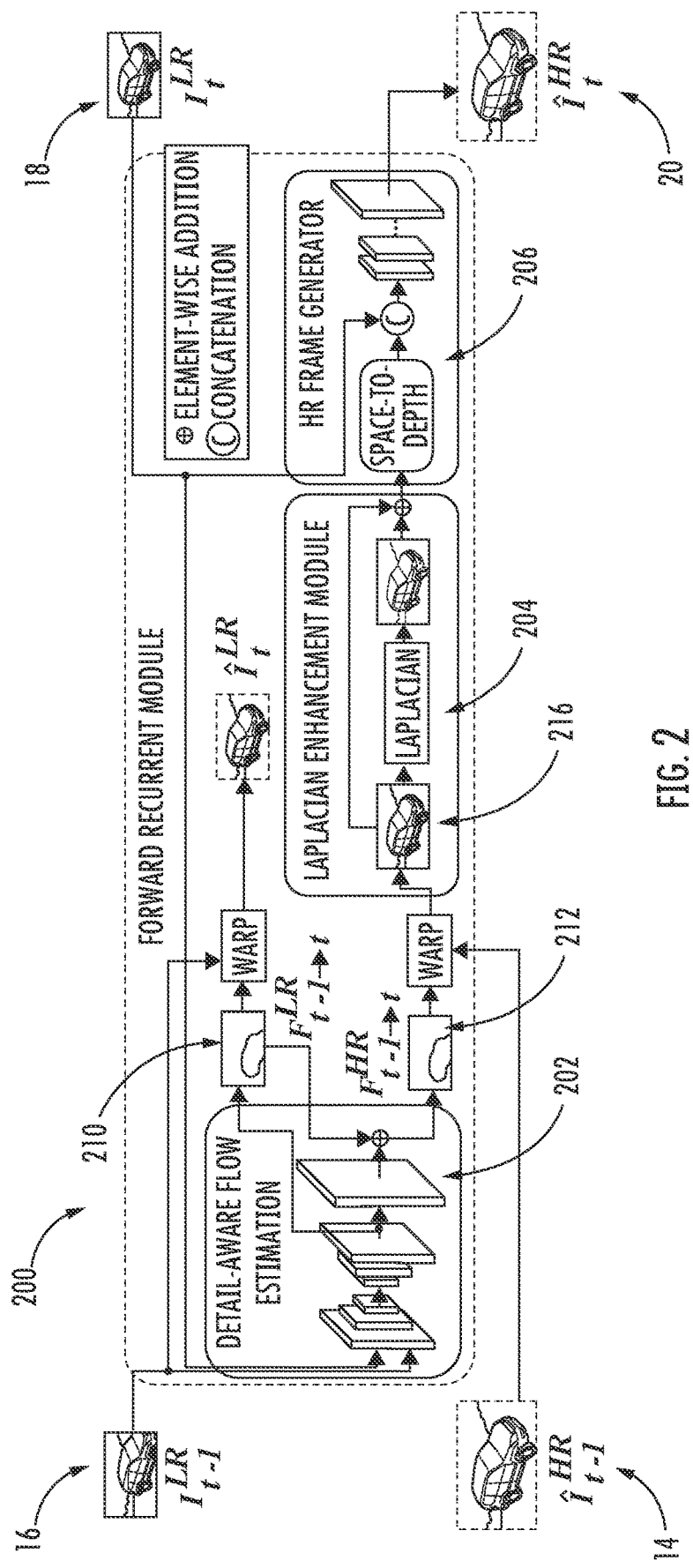
FIG. 2 depicts a graphical diagram of an example architecture of an example machine-learned video super-resolution model according to example embodiments of the present disclosure.

Referring now to FIG. 2, an example architecture for an example VSR model 200 is shown. The model 200 can include a flow estimation portion 202, a Laplacian enhancement portion 204, and/or a frame generation portion 206.

The flow estimation portion 202 can be configured to: process a previous or subsequent lower resolution (LR) video frame (e.g., previous LR video frame 16) and a current LR video frame 18 to generate a LR flow estimation 210 and a higher resolution (HR) flow estimation 212. The flow estimation portion 202 can warp the previous or subsequent LR video frame (e.g. 16) according to the LR flow estimation 210 to generate a predicted LR video frame 214 for a current position in a temporal sequence. The flow estimation portion 202 can warp a previous or subsequent HR video frame (e.g., previous HR frame 14) according to the HR flow estimation 212 to generate an intermediate HR video frame 216 for the current position in the temporal sequence.

The Laplacian enhancement portion 204 can be configured to enhance the intermediate HR video frame 216.

The frame generation portion 206 can be configured to process the intermediate HR video frame 216 (e.g., after enhancement) and the current LR video frame 18 to generate a predicted HR video frame 20 for the current position in the temporal sequence.

Likewise, performing, by the computing system, the backward temporal prediction (not specifically shown) can include processing, by the computing system and using the flow estimation portion 202 of the machine-learned VSR model, the subsequent LR video frame and the current LR video frame to generate a LR backward flow estimation and a HR backward flow estimation; warping, by the computing system, the subsequent LR video frame according to the LR backward flow estimation to generate a backward-predicted LR video frame for the current position in the temporal sequence; and warping, by the computing system, the subsequent HR video frame according to the HR backward flow estimation to generate a backward-intermediate HR video frame for the current position in the temporal sequence.

Likewise, performing, by the computing system, the backward temporal prediction can include: applying, by the computing system, the Laplacian enhancement filter to the backward-intermediate HR video frame; and after applying the Laplacian enhancement filter, processing, by the computing system and using the frame generation portion of the machine-learned VSR model, the backward-intermediate HR video frame and the current LR video frame to generate the backward-predicted HR video frame for the current position in the temporal sequence.

In some implementations, the loss function can further compare: (3) the forward-predicted LR video frame 214 for the current position with the current LR video frame 18 associated with the current position in the temporal sequence; and/or (4) the backward-predicted LR video frame (not specifically shown) for the current position with the current LR video frame associated with the current position in the temporal sequence.

The previous position in the temporal sequence can be an immediately preceding position in the temporal sequence or can be a not-directly-adjacent temporal position. Likewise, the subsequent position in the temporal sequence can be an immediately proceeding position in the temporal sequence or a not-directly-adjacent temporal position.

After training, the machine-learned VSR model can be employed to super-resolve an additional compressed video. For example, employing the machine-learned VSR model to super-resolve the additional compressed video can include performing only forward temporal prediction on video frames of the additional compressed video.

The training techniques described herein can be performed for a plurality of training iterations respectively for a plurality of compressed training videos. The plurality of compressed training videos can have been compressed using a same compression algorithm or multiple different compression algorithms. One example compression algorithm is the H.264 codec.

Example Detail-Aware Flow Estimation

In the proposed recurrent model, the model can explicitly estimate both the LR and HR flows between neighboring frames and pass this information in forward and backward directions.

FIG. 2 shows the forward direction for illustration. The operations in the backward direction are similarly applied. The model can first concatenate two neighboring LR frames $I_{t-1}^{LR}$ and $I_t^{LR}$ and pass it through the LR flow estimation network to generate the LR flow $F_{t-1 \to t}^{LR}$. Instead of directly upsampling the LR flow $F_{t-1 \to t}^{LR}$, the model can apply a few additional deconvolution layers on top of the bilinear upsampled LR flow. Thus, a detailed residual map can be encouraged to be learnt during the end-to-end training, and consequently the model can better preserve high-frequency details in the predicted HR flow.

Example Laplacian Enhancement Module

The Laplacian residual has been widely used in many vision tasks, including image blending, super-resolution, and restoration. It is particularly useful at finding the fine details from a video frame, where such details could be smoothed during video compression. In some examples of the proposed recurrent VSR model, the warped predicted HR frame retains information and some details learned from the previous frames. Such details can be easily missing from the up-scaling network. As such, some example implementations include a Laplacian residual to a predicted HR frame to enhance details.

A Laplacian boosted image can be computed by a Gaussian kernel blur G (•,•) with the width of u:

$$\tilde{I}_t^{HR} = \tilde{I}_t^{HR} + \alpha(\tilde{I}_t^{HR} - G(\tilde{I}_t^{HR}, \sigma=1.5)) \quad (4)$$

where $\tilde{I}_t^{HR}$ is an intermediate results of the predicted HR frame and a is weighted factor controls the residual power. By exploiting the Laplacian, the model can add details back to the warped HR frame. This can be followed by a space-to-depth operation, which rearranges blocks of spatial data into depth dimension, and then concatenation with the LR input frame. The model can pass it through the HR frame generator to generate the final HR prediction.

Example Loss Functions

During training, there are typically two streams: the HR and LR frames. The losses can be designed with consideration of using both of the streams. For loss on HR frames, the $\mathcal{L}_2$ distance can be computed between the final outputs and the HR frames. $I_t$ denotes the ground truth frame and $\tilde{I}_t$ denotes the generated frame at time t. For each of the recurrent steps, the predicted HR frames can be used for computing loss. The $\mathcal{L}_2$ losses can optionally be combined as, $$\mathcal{L}_{content}^{HR} = \frac{1}{2N}\left(\underbrace{\sum_{t=1}^{N}\left\|I_t^{HR} - \hat{I}_t^{HR}\right\|_2}_{forward} + \underbrace{\sum_{t=N}^{1}\left\|I_t^{HR} - \hat{I}_t^{HR}\right\|_2}_{backward}\right) \quad (5)$$

Each of the warped LR frames from t−1 to t can also be penalized with the $\mathcal{L}_2$ distance with respect to the current LR frame as, $$\mathcal{L}_{warp}^{HR} = \frac{1}{2N}\left(\underbrace{\sum_{t=1}^{N}\left\|I_t^{LR} - \hat{I}_{t-1}^{Warp}\right\|_2}_{forward} + \underbrace{\sum_{t=N}^{1}\left\|I_t^{LR} - \hat{I}_{t-1}^{Warp}\right\|_2}_{backward}\right) \quad (6)$$

One example total loss can be the sum of the HR and LR losses, $$\mathcal{L}_{total} = \beta \mathcal{L}_{content}^{HR} + \gamma \mathcal{L}_{warp}^{LR} \quad (7)$$

where β and γ are weights for each loss.

Example Devices and Systems

Figure 3A:
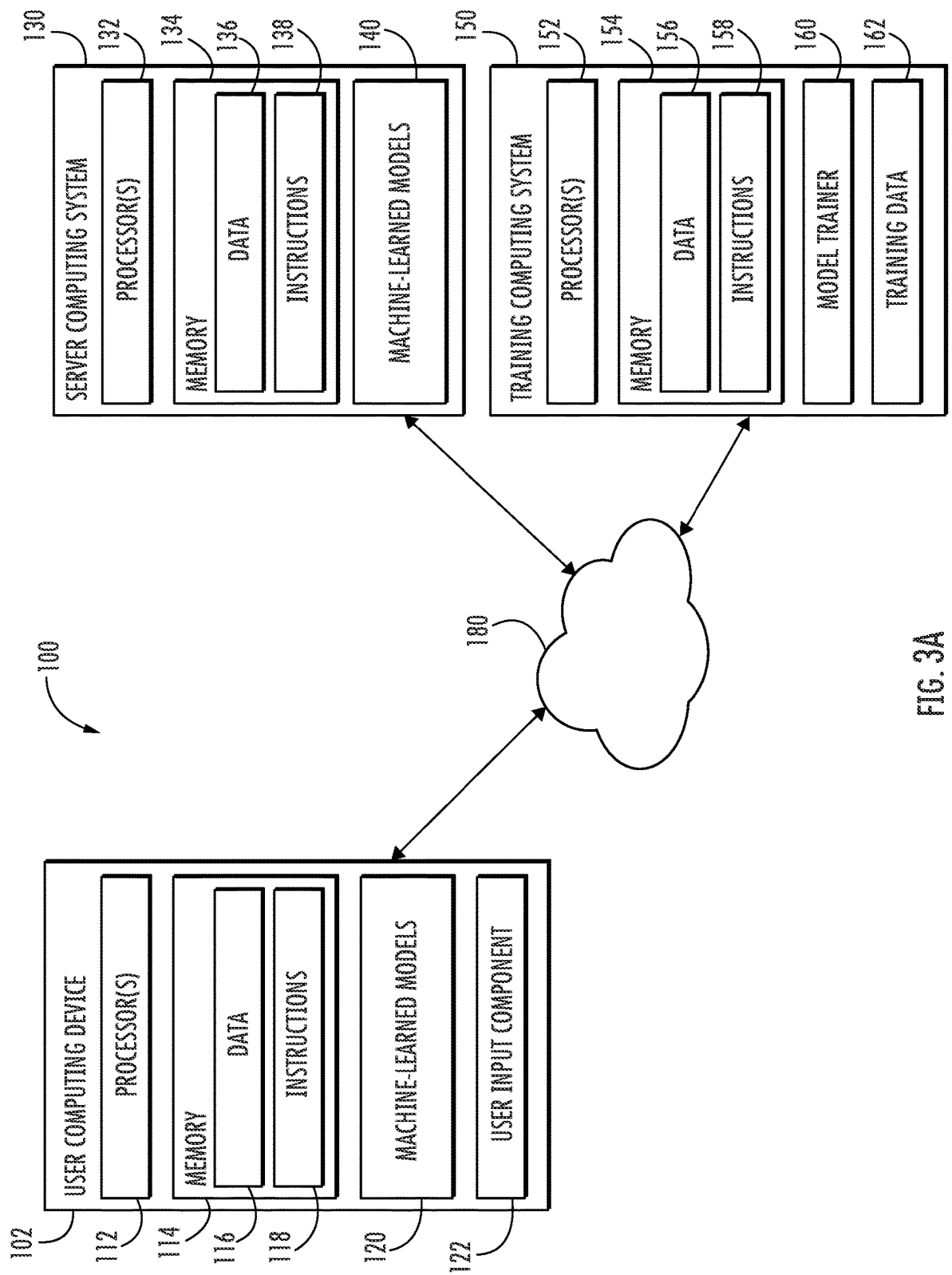
FIG. 3A depicts a block diagram of an example computing system according to example embodiments of the present disclosure.

FIG. 3A depicts a block diagram of an example computing system 100 that performs video super-resolution according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned VSR models 120. For example, the machine-learned VSR models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned VSR models 120 are discussed with reference to FIGS. 1A, 1B, and 2.

In some implementations, the one or more machine-learned VSR models 120 can be received from the server computing system 130 over network 180, stored in the user computing device memory 114, and then used or otherwise implemented by the one or more processors 112. In some implementations, the user computing device 102 can implement multiple parallel instances of a single machine-learned VSR model 120 (e.g., to perform parallel video super-resolution across multiple instances of lower resolution videos).

Additionally or alternatively, one or more machine-learned VSR models 140 can be included in or otherwise stored and implemented by the server computing system 130 that communicates with the user computing device 102 according to a client-server relationship. For example, the machine-learned VSR models 140 can be implemented by the server computing system 140 as a portion of a web service (e.g., a video super-resolution service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned VSR models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1A, 1B, and 2.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned VSR models 120 and/or 140 based on a set of training data 162. The training data 162 can include, for example, ground truth video data. For example, ground truth video data can contain a video in both a higher resolution form and a corresponding lower resolution form.

In some implementations, the training data can include the REDS and/or Vimeo datasets for training. The REDS dataset contains more than 200 video sequences for training, each of which has 100 frames with 1280×720 resolution. The Vimeo-90K dataset contains about 65k video sequences for training, each of which has 7 frames with 448×256 resolution. One main difference between these two datasets is the REDS dataset has much larger motion between consecutive frames captured from a hand-held device. To train and evaluate the COMISR model, the frames can be first smoothed by a Gaussian kernel with width of 1.5 and downsampled by 4×.

In some implementations, the COMISR model can be evaluated on the Vid4 and REDS4 datasets (clip #000, 011, 015, 020). All the testing sequences have more than 30 frames.

In some implementations the following compression methods can be used. One example follows the most common setting for the H.264 codec at different compression rates (i.e., different CRF values). The recommended CRF value is between 18 and 28, and the default is 23 (although the value ranges between 0 and 51). In some example, CRF of 15, 25, and 35 can be used to evaluate video super-resolution with a wide range of compression rates. In some implementations, the same degradation method to generate the LR sequences before compression. Finally, such compressed LR sequences are fed into the VSR models for inference.

In some implementations the following training process can be used. In some implementations, for each of the input frames, the training process can randomly crop patches (e.g., 128×128 patches) from a mini-batch as input. Each mini-batch can include a number of samples (e.g., 16 samples). The $\alpha$, $\beta$, and $\gamma$ parameters can be set to 1, 20, 1, respectively. The model training can be supervised by the losses described elsewhere herein. The Adam optimizer can be used with $\beta\_1=0.9$ and $\beta\_2=0.999$. The learning rate can be set to $5\times10^{\wedge}(-5)$. Video compression can optionally be adopted as an additional data augmentation method to the training pipeline with a probability of 50% on the input batches.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 3A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 3B:
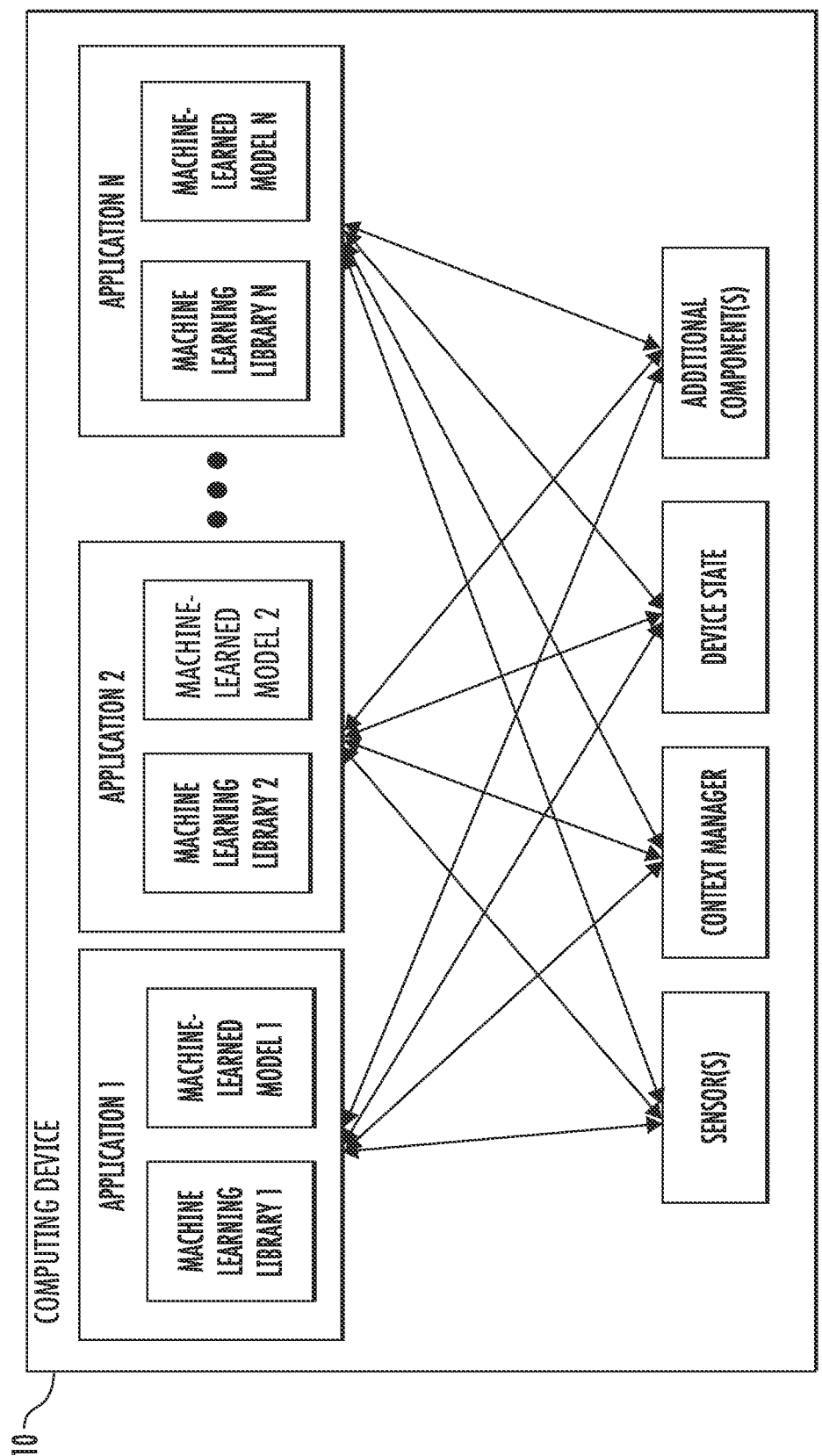
FIG. 3B depicts a block diagram of an example computing device according to example embodiments of the present disclosure.

FIG. 3B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 3B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 3C:
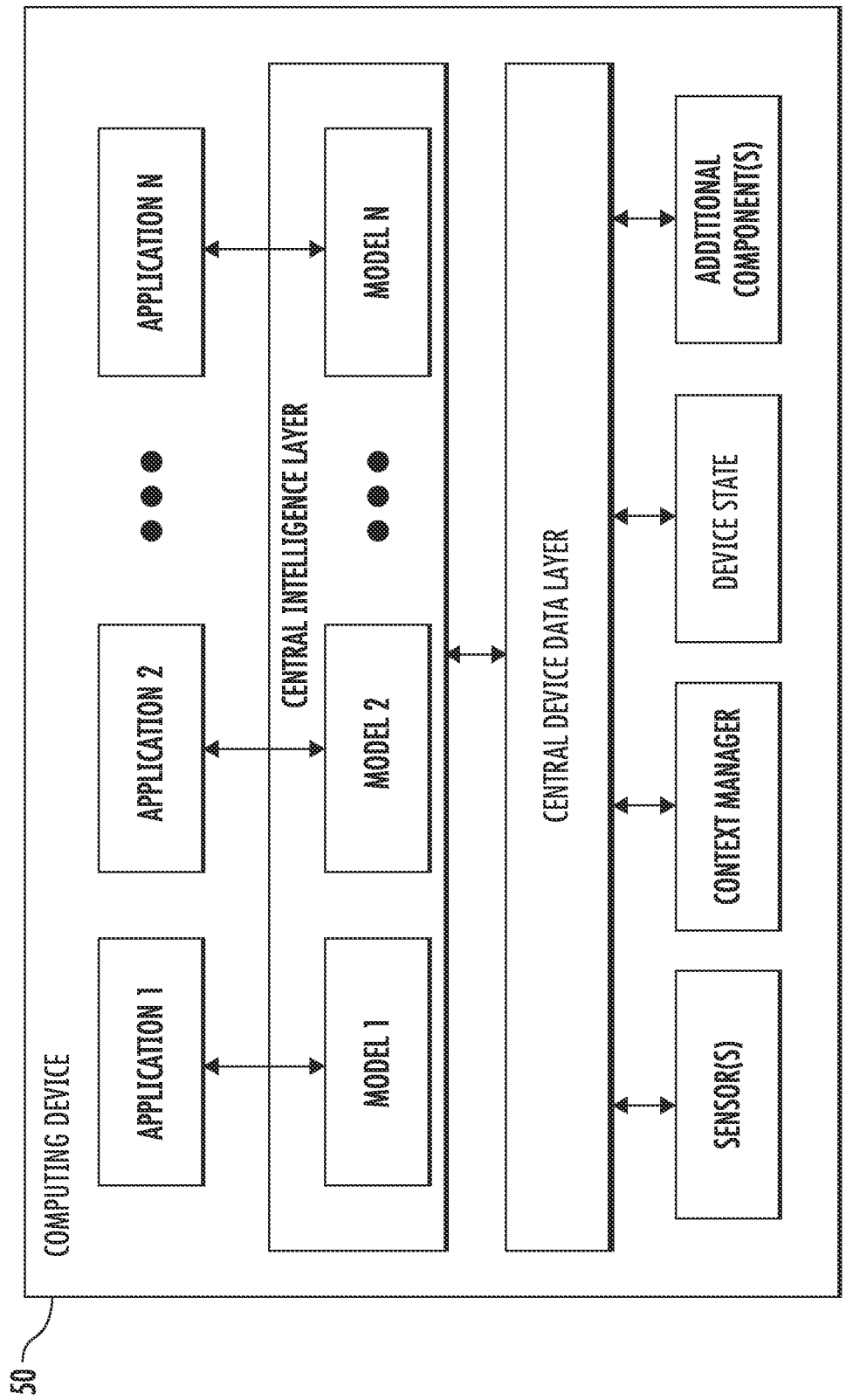
FIG. 3C depicts a block diagram of an example computing device according to example embodiments of the present disclosure.

FIG. 3C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 3C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 3C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to bi-directionally train a machine-learned video super-resolution (VSR) model using compressed video data, the method comprising:

obtaining, by a computing system comprising one or more computing devices, a set of ground truth video data that comprises a plurality of ground truth higher-resolution (HR) video frames and a plurality of lower-resolution (LR) video frames, wherein the plurality of LR video frames respectively correspond to the plurality of ground truth HR video frames, and wherein the plurality of ground truth HR video frames and the plurality of LR video frames are arranged in a temporal sequence that corresponds to a compressed video;

for each of one or more positions in the temporal sequence:

performing, by the computing system, a forward temporal prediction to generate a forward-predicted HR video frame for the current position in the temporal sequence based on one or more video frames associated with one or more previous positions in the temporal sequence, wherein performing the forward temporal prediction comprises processing, by the computing system and using the machine-learned VSR model, a previous HR video frame associated with a previous position in the temporal sequence, a previous LR video frame associated with the previous position in the temporal sequence, and a current LR video frame associated with a current position in the temporal sequence to generate the forward-predicted HR video frame for the current position in the temporal sequence;

performing, by the computing system, a backward temporal prediction to generate a backward-predicted HR video frame for the current position in the temporal sequence based on one or more video frames associated with one or more subsequent positions in the temporal sequence, wherein performing the backward temporal prediction comprises processing, by the computing system using the machine-learned VSR model, a subsequent HR video frame associated with a subsequent position in the temporal sequence, a subsequent LR video frame associated with the subsequent position in the temporal sequence, and a current LR associated with a current position in the temporal sequence to generate the backward-predicted HR video frame for the current position in the temporal sequence;

evaluating, by the computing system, a loss function for the machine-learned VSR model, wherein the loss function compares the ground truth HR video frame to the forward-predicted HR video frame and compares the ground truth HR video frame to the backward-predicted HR video frame; and modifying, by the computing system, one or more values of one or more parameters of the machine-learned VSR model based on the loss function;

wherein the previous position in the temporal sequence comprises an immediately preceding position in the temporal sequence and wherein the subsequent position in the temporal sequence comprises an immediately proceeding position in the temporal sequence.

2. The computer-implemented method of claim 1, wherein:

the previous HR video frame comprises a previous predicted HR video frame; and the subsequent HR video frame comprises a subsequent predicted HR video frame.

3. The computer-implemented method of claim 1, wherein:

the previous HR video frame comprises a previous ground truth HR video frame; and the subsequent HR video frame comprises a subsequent ground truth HR video frame.

4. The computer-implemented method of claim 1, wherein:

performing, by the computing system, the forward temporal prediction comprises:

processing, by the computing system and using a flow estimation portion of the machine-learned VSR model, the previous LR video frame and the current LR video frame to generate a LR forward flow estimation and a HR forward flow estimation;

warping, by the computing system, the previous LR video frame according to the LR forward flow estimation to generate a forward-predicted LR video frame for the current position in the temporal sequence; and warping, by the computing system, the previous HR video frame according to the HR forward flow estimation to generate a forward-intermediate HR video frame for the current position in the temporal sequence; and performing, by the computing system, the backward temporal prediction comprises:

processing, by the computing system and using the flow estimation portion of the machine-learned VSR model, the subsequent LR video frame and the current LR video frame to generate a LR backward flow estimation and a HR backward flow estimation;

warping, by the computing system, the subsequent LR video frame according to the LR backward flow estimation to generate a backward-predicted LR video frame for the current position in the temporal sequence; and warping, by the computing system, the subsequent HR video frame according to the HR backward flow estimation to generate a backward-intermediate HR video frame for the current position in the temporal sequence.

5. The computer-implemented method of claim 4, wherein the loss function further compares:

the forward-predicted LR video frame for the current position with the current LR video frame associated with the current position in the temporal sequence; and the backward-predicted LR video frame for the current position with the current LR video frame associated with the current position in the temporal sequence.

6. The computer-implemented method of claim 4, wherein:

performing, by the computing system, the forward temporal prediction further comprises:

applying, by the computing system, a Laplacian enhancement filter to the forward-intermediate HR video frame; and after applying the Laplacian enhancement filter, processing, by the computing system and using a frame generation portion of the machine-learned VSR model, the forward-intermediate HR video frame and the current LR video frame to generate the forward-predicted HR video frame for the current position in the temporal sequence; and performing, by the computing system, the backward temporal prediction comprises:

applying, by the computing system, the Laplacian enhancement filter to the backward-intermediate HR video frame; and after applying the Laplacian enhancement filter, processing, by the computing system and using the frame generation portion of the machine-learned VSR model, the backward-intermediate HR video frame and the current LR video frame to generate the backward-predicted HR video frame for the current position in the temporal sequence.

7. The computer-implemented method of claim 1, wherein the compressed video comprises a compressed videoconference video stream.

8. The computer-implemented method of claim 1, further comprising:

employing, by the computing system, the machine-learned VSR model to super-resolve an additional compressed video, wherein employing, by the computing system, the machine-learned VSR model to super-resolve the additional compressed video comprises performing only forward temporal prediction on video frames of the additional compressed video.

9. The computer-implemented method of claim 1, further comprising:

performing the method described in claim 1 for a plurality of training iterations respectively for a plurality of compressed training videos, wherein the plurality of compressed training videos have been compressed using a same compression algorithm.

10. The computer-implemented method of claim 9, wherein the compression algorithm comprises an H.264 codec.

11. The computer-implemented method of claim 1, further comprising:
performing the method described in claim 1 for a plurality of training iterations respectively for a plurality of compressed training videos, wherein the plurality of compressed training videos have been compressed using two or more different compression algorithms.

12. The computer-implemented method of claim 1, further comprising:
employing, by the computing system, the machine-learned VSR model to super-resolve an additional compressed video.

13. The computer-implemented method of claim 12 wherein employing, by the computing system, the machine-learned VSR model to super-resolve the additional compressed video comprises performing only forward temporal prediction on video frames of the additional compressed video.

14. One or more non-transitory computer-readable media that collectively store a machine-learned VSR model that has been trained according to the method of claim 1.

* * * * *